US009805082B2

(12) United States Patent
Bornhoevd et al.

(10) Patent No.: US 9,805,082 B2
(45) Date of Patent: Oct. 31, 2017

(54) RECORDING INFORMATION ABOUT AN ITEM

(75) Inventors: Christof Bornhoevd, Belmont, CA (US); Horst Werner, Muehlhausen-Rettigheim (DE)

(73) Assignee: SAP SE, Walldorf (DE)

( * ) Notice: Subject to any disclaimer, the term of this patent is extended or adjusted under 35 U.S.C. 154(b) by 1646 days.

(21) Appl. No.: 12/207,628

(22) Filed: Sep. 10, 2008

(65) Prior Publication Data

US 2010/0076931 A1    Mar. 25, 2010

(51) Int. Cl.
*G06F 7/00* (2006.01)
*G06F 17/00* (2006.01)
*G06F 17/30* (2006.01)
*G06Q 10/06* (2012.01)
*G06Q 30/00* (2012.01)
*G06F 11/14* (2006.01)

(52) U.S. Cl.
CPC .. *G06F 17/30356* (2013.01); *G06F 17/30309* (2013.01); *G06Q 10/06* (2013.01); *G06Q 30/00* (2013.01); *G06F 11/1471* (2013.01)

(58) Field of Classification Search
CPC ............ G06Q 30/0623; G06Q 30/0639; G06F 17/30309; G06F 17/30356; G06F 17/30604
USPC ......... 707/748, 751, 638, 695; 717/122, 170
See application file for complete search history.

(56) References Cited

U.S. PATENT DOCUMENTS

| 5,317,729 | A | * | 5/1994 | Mukherjee et al. | |
| 5,835,711 | A | * | 11/1998 | Chang et al. | 709/232 |
| 8,156,073 | B1 | * | 4/2012 | Dave et al. | 707/602 |
| 8,195,693 | B2 | * | 6/2012 | Syeda-Mahmood | 707/790 |
| 2003/0004971 | A1 | * | 1/2003 | Gong | G06Q 10/087 |
| 2004/0128391 | A1 | * | 7/2004 | Patzer | H04L 12/66 709/228 |
| 2004/0254792 | A1 | * | 12/2004 | Busayapongchai | H04M 3/4938 704/260 |
| 2005/0033828 | A1 | * | 2/2005 | Watanabe | G06F 11/2074 709/219 |
| 2006/0184589 | A1 | * | 8/2006 | Lees et al. | 707/201 |

(Continued)

OTHER PUBLICATIONS

Mok et al. "Transaction Processing in an Asymmetric Mobile Environment" Department of Computing, Hong Kong Polytechnic University, Hong Kong MDA '99, pp. 71-82, 1999.*

(Continued)

*Primary Examiner* — Jason Liao
*Assistant Examiner* — Berhanu Mitiku
(74) *Attorney, Agent, or Firm* — Fish & Richardson P.C.

(57) ABSTRACT

Among other disclosed subject matter, a computer program product is tangibly embodied in a computer-readable storage medium and includes instructions that when executed by a processor perform a method for recording information about an item. The method includes assigning a unique identifier to an item in a repository, the item supporting versioning and being subject to a data model having no predefined schema for items. The method includes associating a first attribute with the unique identifier, the first attribute being part of the item and being configured for modification. The method includes associating the first attribute with a version number, wherein the versioning is supported without recording in the repository a time period when the first attribute is valid.

16 Claims, 8 Drawing Sheets

(56) References Cited

U.S. PATENT DOCUMENTS

2007/0022145 A1* 1/2007 Kavuri .......................... 707/204
2008/0027830 A1* 1/2008 Johnson et al. ................ 705/27

OTHER PUBLICATIONS

Argawal, R. et al.,: "*Storage and Querying of E-Commerce Data*", In Proc. 27$^{th}$ VLDB Conference, Roma, Italy, 2001.
Copland, G.P. et al., "*A Decomposition Storage Model*", In Proc. ACM SIGMOD, Austin, Texas, 1985.
Florescu, D. et al.,: "*A Performance Evaluation of Alternative Mapping Schemes for Storing XML Data in a Relational Database*", Technical Report, INRIA, France, May 1999.
Missikoff, M.: "*A Domain-Based Internal Schema for Relational Database Machines*", In Proc. ACM SIGMOD, Florida, USA, 1982.
W3C: "*Resource Description Framework (RDF): Concepts and Abstract Syntax*", W3C Recommendation, Feb. 2004.
Nuescheler, D. et al.: "*Content Repository API for Java ™ Technology Specification*", Java Specification Request 170, Version 1.0 11, May 2005.

* cited by examiner

RECORDING INFORMATION ABOUT AN ITEM

TECHNICAL FIELD

This document relates to recording information about an item.

BACKGROUND

Businesses often use data as the basis for business decisions. A business decision can rely on structured data, such as data stored in a relational database. Other data can be used in business decision making, such as unstructured data from heterogeneous sources, such as in the form of XML (eXtensible Markup Language), text, PDF (Portable Document Format), audio and video.

Histories of different versions of data items can be stored. Having access to historical versions of data items can assist in the analysis and interpretation of data. For example, examining historical versions of data items can assist in analyzing the quality, timeliness, reliability, and volatility of data, to name a few examples. In addition, having access to prior versions of a data item can allow for the "rolling back" of a data item to a previous version, such as if an error in data processing is discovered.

SUMMARY

The invention relates to recording information about an item.

In a first aspect, a computer program product is tangibly embodied in a computer-readable storage medium and includes instructions that when executed by a processor perform a method for recording information about an item. The method includes assigning a unique identifier to an item in a repository, the item supporting versioning and being subject to a data model having no predefined schema for items. The method includes associating a first attribute with the unique identifier, the first attribute being part of the item and being configured for modification. The method includes associating the first attribute with a version number, wherein the versioning is supported without recording in the repository a time period when the first attribute is valid.

Implementations can include any, all or none of the following features. The first attribute can include at least a URI, a type identifier and a source of the first attribute. The version number can be obtained by incrementing by a predetermined amount an earlier version number associated with an earlier version of the first attribute. The method can further include adding an association to the item in the repository, the association comprising that the item is associated in the repository with another item also subject to the data model; and associating the association with an association version number. The method can further include associating also a second attribute with the unique identifier, the second attribute being part of the item and being configured for modification; and associating the second attribute with a second-attribute version number, without recording in the repository a time period when the second attribute is valid. The method can further include deriving a schema for the item in accordance with the data model, the schema reflecting at least that the first attribute is part of the item. The method can further include asynchronously updating another repository about the version number, the other repository storing version numbers for a plurality of items organized by cycle numbers. The repository and the other repository can be configured so that: updating the item to a previous version number is performed using the repository without accessing the other repository and without querying the repository based on a time stamp; and obtaining a past state relating to the item and at least one associated item is performed using the other repository to obtain a valid version number for the associated item corresponding to a version number the item had in the past state. The method can further include synchronously updating another repository about the version number, the other repository storing version numbers for a plurality of items organized by cycle numbers.

In a second aspect, a computer program product is tangibly embodied in a computer-readable storage medium and includes instructions that when executed by a processor perform a method for obtaining an earlier version of an item. The method includes identifying an item for which an earlier version is to be obtained, the item being subject to a data model having no predefined schema for items. The method includes obtaining, from a repository and using a version number associated with the earlier version, attribute information having an association with the item, wherein a time period when the association is valid is not recorded in the repository. The method includes generating the earlier version based on the attribute information.

Implementations can include any, all or none of the following features. The association of the attribute information can include a unique identifier of the item.

In a third aspect, a computer program product is tangibly embodied in a computer-readable storage medium and includes instructions that when executed by a processor perform a method for recording versioning information about an item. The method includes identifying an item associated with a new version number, the item having an item identifier and being subject to a data model having no predefined schema for items. The method includes assigning a cycle number to the item based on an earlier cycle number associated with an earlier version of the item. The method includes storing the cycle number and the version number in a repository, in association with the item identifier.

Implementations can include any, all or none of the following features. Assigning the cycle number can include incrementing an earlier cycle number by a predetermined amount, the earlier cycle number and an earlier version number being associated with the item identifier. The repository can track a time when the item has the version number. Identifying the item can include receiving the item identifier and the new version number at a cycle server, the item identifier and the new version number being forwarded asynchronously from a system that records information about the item for performing versioning. The repository can be configured so that: updating the item to a previous version number is performed using the system without accessing the repository and without querying the system based on a time stamp; and obtaining a past state relating to the item and at least one associated item is performed using the repository to obtain a valid version number for the associated item corresponding to a version number the item had in the past state. Identifying the item can include receiving the item identifier and the new version number at a cycle server, the item identifier and the new version number being forwarded synchronously from a system that records information about the item for performing versioning.

In a fourth aspect, a computer program product is tangibly embodied in a computer-readable storage medium and includes instructions that when executed by a processor perform a method for identifying earlier versions of associated items. The method includes identifying a first item having a version number, wherein a past state relating to the first item and at least one associated item is to be obtained, the items being subject to a data model having no predefined schema for items. The method includes obtaining an identifier for the associated item. The method includes obtaining from a repository at least one version number for the associated item valid for the version number of the first item, the repository storing version numbers for a plurality of items organized by cycle numbers.

Implementations can include any, all or none of the following features. The method can further include obtaining from another repository information about the first item and the associated item, the repository supporting versioning without recording in the repository a time period when an attribute of the first item is valid, the information obtained using the version number and the version number for the associated item. The method can further include generating a snapshot of the past state using the information obtained from the other repository.

Implementations can provide any or all of the following advantages. More efficient versioning can be provided. Versioning control can be provided in which lookups of earlier versions of individual items can be done without regard for temporal validity and/or associated items. System snapshots for earlier states can be created using a cycle number feature that tracks temporal validities and/or associations to other data items.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
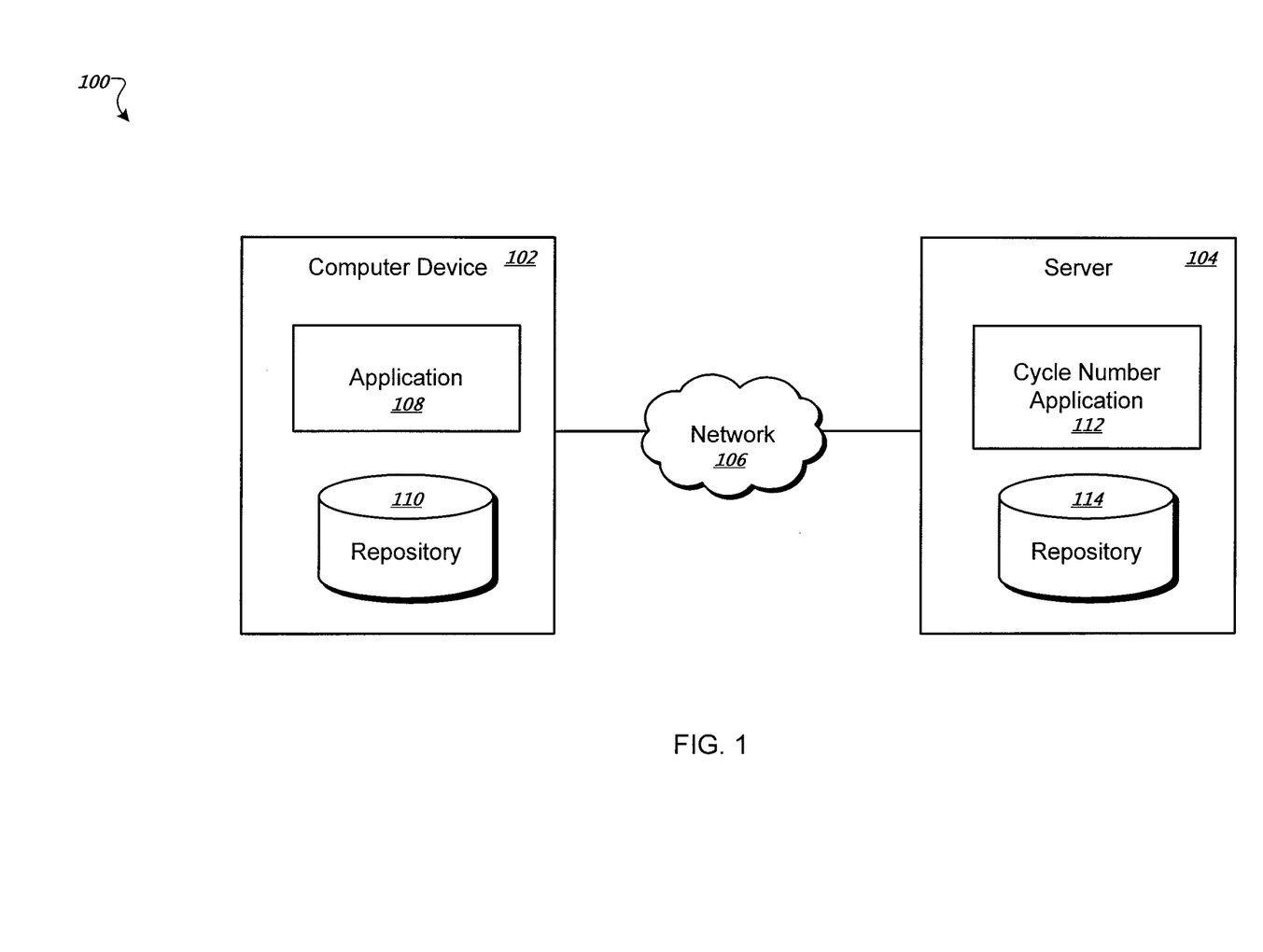
FIG. 1 illustrates an environment for using data items.

FIG. 1 illustrates a system 100 for using data items. A computer device 102 is connected to a server 104 over any kind of network 106, such as a local network or the Internet. An application 108 can run on the computer device 102. For example, the application 108 can be part of an enterprise resource planning (ERP) system, such as to provide an e-commerce application. Any kind of computers or other processor-based devices can be used. For example, some implementations can include devices having a client-server configuration.

The application 108 may use information related to one or more items. An item can include a set of related information. For example, the application 108 may be configured so that it uses information related to one or more product items and processes this information in its execution to perform operations regarding the product item(s). Product information can be manifest in form of, for example, attributes and can relate to features such as product name, product description, product price, etc. Items can be associated with one or more other items. For example, a product item can be related to one or more customer items. Below will be described examples illustrating that items are generated and used without having a predefined schema. Rather, a schema can be derived from existing item information at a given point in time. In other words, as the set of items in the system changes over time, the derived schema can also change.

Item information can be stored in a repository 110. The repository 110 can store attribute values and definitions of associations between items. In some implementations, the repository 110 can store type templates, which describe attributes of classes of items.

Information stored for items can change over time. For example, at a certain point in time, new information regarding a product, for example information relating to a "condition" attribute of the product, may be stored for product items. As new information needs are identified, one or more new attributes can be added to an item. Thus, the item can have different contents and/or structure at different times.

It can be useful to roll back to a historical version of an item. This can be required for the proper operation of the application 108 and/or to maintain consistency in the system 100. For example, it can be useful to be able to retrieve and review an earlier version of the item that was valid at a prior point in time when the item had a different set or number of attributes than it currently does. As another example, it can be useful to determine when a specific product attribute was added.

The repository 110 can store historical versions of an item, in addition to storing the current version of an item. Attribute information can include a version number to identify the associated version of an item. An item can be rolled back to an earlier version by searching the repository 110 for attribute information which is associated with the desired version number. The earlier version can then be generated using attribute information retrieved from the repository 110. In some implementations, rollback requests can be performed without having to specify any validity date(s) for version numbers of interest. For example, this can provide the advantage that relatively simple versioning operations such as rollbacks can be performed using comparatively less resources than, say, a versioning operation to create a snapshot of the system or part thereof pertaining to a particular point in time. The latter operations, which will be exemplified below and can require relatively more complex processing. Thus, additional resources such as the server 104, can with advantage predominantly be used for the relatively more demanding versioning operations.

In some implementations, for the sake of efficiency, the repository 110 may not reflect the times when particular versions were valid, or which versions of associated items were valid during the lifespan of a version of a particular item. For example, while the repository 110 may reflect the version numbers of a customer item that have been applicable during the lifetime of a particular version of a product item, it may not contain complete information as to the validity dates of the version numbers, or information about item associations. To illustrate a more detailed example, suppose that the current version of a product item is version number 4, and that it is desired to roll-back to, or to generate, an earlier version number 2 of the product item. Also suppose that the current version of an associated customer item is version number 3. In some implementations, the computer repository 110 may contain sufficient information for recreating any of the earlier versions if the version number is known. However, in some implementations the repository does not store sufficient information to determine which of the versions 1, 2, and 3 of the customer item were associated with version 2 of the product item, or whether the version 2 of the product item was even related to a customer item at that point in time. This can provide the advantage of allowing expedient and flexible lookups in the repository 110 for standard inquiries.

In contrast, information relating to versions and/or item associations can be maintained separately from the repository 110. In some implementations, the server 104 can store information to support determining one or more versions of an associated item that was valid during the lifespan of a version of a particular item. For example, when a new version of an item in the repository 110 is created, the computer device 102 can send a unique identifier and new version number of the item to the server 104 over the network 106. In some implementations, the information can be sent asynchronously to the server 104. This can, for example, provide the advantage that the application 108 and/or the computer device 102 is not unnecessarily tied up by the process of documenting the identifier or version number. Rather, the application 108 can continue its operations while the server 104 is busy, including that the version number can be used before confirmation of the successful receipt, if any, is received from the server 104.

A cycle number application 112 can assign a cycle number to the version of the item based on an earlier cycle number associated with an earlier version of the item. For example, the cycle number application 112 can increment an earlier cycle number by a predetermined amount (e.g., 1). The cycle number and the version number can be stored in a repository 114, in association with the item identifier. The repository 114 can also track a time when an item has a particular version number, to name another example.

The repository 114 can be used to restore a snapshot of a past state that involves an item of interest relating to one or more associated items. For example, the computer device 102 can send a request to the server 104, where the request includes an identifier and version number of an item of interest, and identifiers of one or more associated items. The server 104 can obtain, from the repository 114, version numbers of the associated items which were valid for the specified version number of the item of interest. This can involve, then, selecting at least one of several version numbers for the associated item(s) based on which of corresponding earlier versions was associated with the particular version of the item of interest.

The server 104 can send the version numbers of the associated items to the computer device 102. The computer device 102 can obtain attribute information for the desired version of the item from the repository 110, using the obtained version numbers), optionally along with information about desired versions of associated items. The computer device 102 can generate a snapshot of the past state of the item of interest using the information obtained from the repository 110. In some implementations, the snapshot can be output to a user in any form, such as by a presentation in a user interface.

The network 106 can include one or more wired or wireless networks, such as a LAN (Local Area Network), WAN (Wide Area Network), or the Internet, to name a few examples. The computer device 102 can include a desktop computer, laptop computer, personal digital assistant (PDA), mobile phone, media player, or gaming device, to name just a few examples. The server 104 can be one or more physical computing devices. In some implementations, the computer device 102 and the server 104 can be included in the same physical device. That is, the application 108, repository 110, cycle number application 112 and repository 114 can reside on the same physical device.

Figure 2:
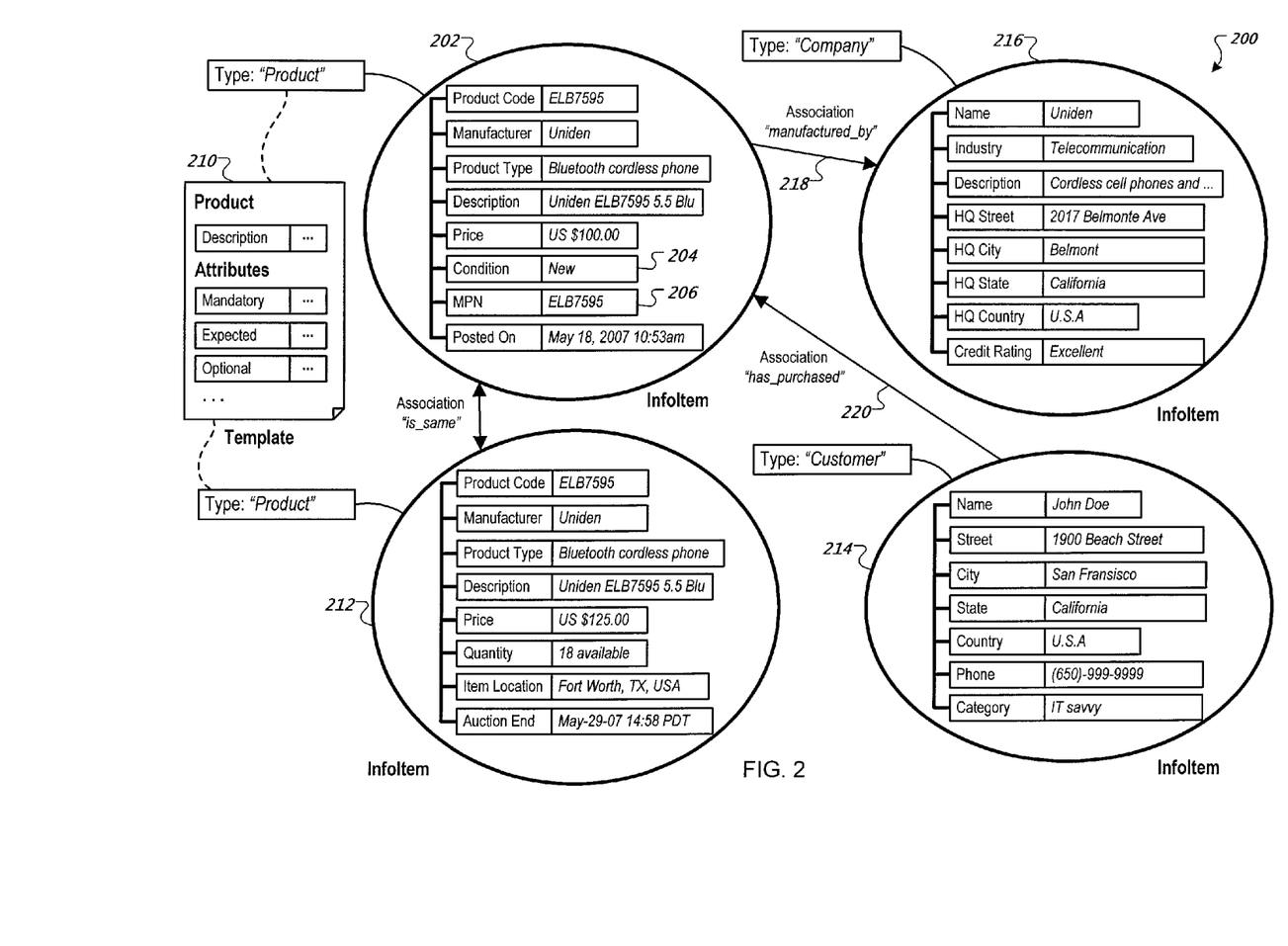
FIG. 2 illustrates example data.

FIG. 2 illustrates example data 200. Items can be classified by type, where each instance of an item type has attributes which are similar or identical to attributes of other instances. For example, the example data 200 includes an item instance 202 of type "product" which includes product code, manufacturer, product type, description, price, condition, MPN (Manufacturer Part Number), and "posted on" attributes.

A particular instance of an item may have an associated value for some or all attributes described by a type. For example, the product item instance 202 includes a value of "New" 204 for a condition attribute and a value of "ELB7595" 206 for a manufacturer part number (MPN) attribute. As illustrated by an example product type template 210, a type template can include a description of an item type and can also define whether each attribute of an item is mandatory, expected, or optional for an item instance.

An item instance can have attributes that are not included in another instance of the same item type. For example, although the product item instance 202 and a second product item instance 212 are of the same item type and both include product code, manufacturer, product type, description and price attributes, each of the instances 202 and 212 can include one or more attributes that the other instance does not include. For example, the product item instance 202 includes condition, MPN, and "posted on" attributes, and the product item instance 212 includes quantity, item location, and "auction end" attributes.

In addition to the product item instances 202 and 212, the example data 200 also includes a customer item instance 214 and a company item instance 216. As mentioned above, items can be related to one another. An association can represent a relationship between two items. For example, a "manufactured_by" association 218 represents a relationship between the product item instance 202 and the company item instance 216. The association 218 indicates that the company described by the company item instance 216 manufactures the product described by the product item instance 202. As another example, a "has_purchased" association 220 represents a relationship between the product item instance 202 and the customer item instance 214. The association 220 indicates that the customer described by the customer item instance 214 has purchased the product described by the product item instance 202. In some implementations, association types (e.g., "has_purchased") are not predefined by a data model but can be defined by an application developer.

A schema can be derived from a set of identified items. For example, a schema can be derived given the example information included in the items 202 and 212-216. The schema can be derived using the computer device 102 and/or the server 104. For example, the schema derived for the example data 200 can indicate the attributes of the respective item types and the association(s) with one or more other items. As new information is discovered or identified, the schema can evolve (e.g., new items, attributes and associations can be added) to model the overall set of observed information. In other words, the example data 200 may have no predefined schema for items, but rather a schema may be derived that is in accordance with the example data.

Figure 3:
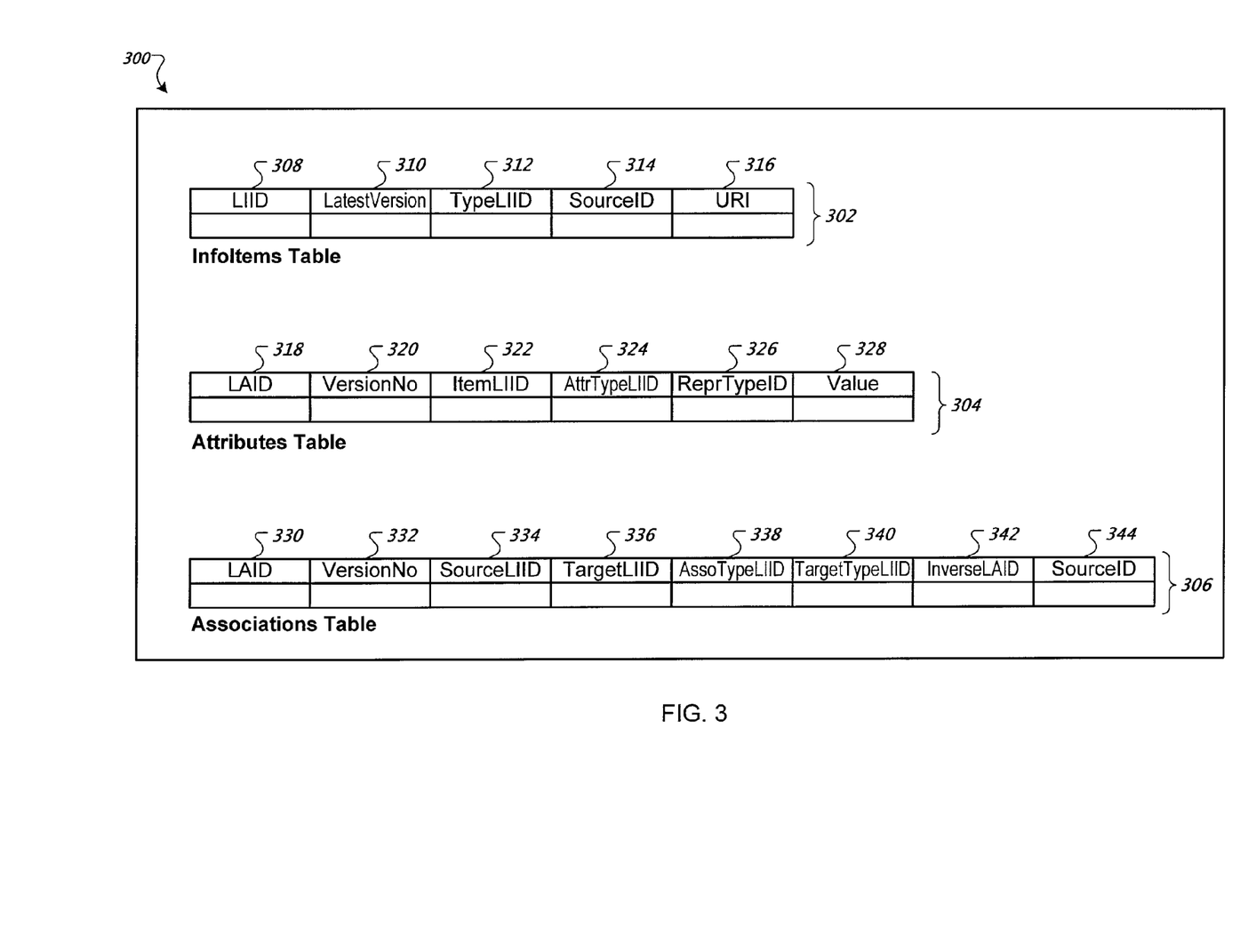
FIG. 3 illustrates an example physical data representation format.

FIG. 3 illustrates an example physical data representation format 300. The physical data representation format 300 is an implementation that can be used in a relational database system. Other physical representations are possible. The physical data representation format 300 includes an InfoItems table 302, an attributes table 304, and an associations table 306. In short, the InfoItems table can define one or more unique items, whose attribute(s) can be stored in the attributes table 304 and whose association(s) with other item(s) can be stored in the associations table 306. In some implementations, the information items referred to can include one or more "InfoItem" structures as used in systems from SAP AG. For simplicity, the term InfoItem is sometimes used herein, as an example of how the information item can be implemented. The tables 302-306 may be stored, for example, in the repository 110.

The InfoItems table 302 can store information relating to items, and includes a local information item identifier "LIID" column 308, a "LatestVersion" column 310, a "TypeLIID" column 312, a "SourceID" column 314, and a "URI" column 316.

The InfoItems table 302 can include data that remains stable across different versions of the same item. For example, the "URI" column 316 can store an item's Uniform Resource Identifier, which is an address for identifying the item on a private network or on a public network, such as the Internet. The "LIID" column 308 can store an identifier for an item which uniquely identifies the item within the InfoItems table 302. The "TypeLIID" column 312 can store an identifier of a type that is associated with a reference to an item type, which in turn can be stored as an item of a built-in type "Term". The "LatestVersion" column 310 can store the latest version number of an item.

The attributes table 304 can store information relating to attributes of items, and includes an "LAID" column 318, a "VersionNo" column 320, a "ItemLIID" column 322, an "AttrTypeLIID" column 324, a "ReprTypeID" column 326, and a "Value" column 328. A row in the attributes table 304 can be uniquely identified by the value stored in the "LAID" (Local Attribute Identifier) column 318. The "VersionNo" column 320 can store the latest version number for an attribute. The "ItemLIID" column 322 can store a reference to the corresponding item that an attribute belongs to (i.e., the value of the "ItemLIID" column 322 for an attribute can match the value of the "LIID" column 308 for a row in the InfoItems table 302). The "AttrTypeLIID" column 324 can store a reference to an attribute's type. The "Value" column 328 can store the value of an attribute as a character string. The "ReprTypeID" column 326 can store a reference to an attribute's physical representation type (e.g., indicating data type, storage size, encoding schemes, etc.). The referenced physical representation type can indicate type information for conversion from a character string to a respective value type.

The associations table 306 can store information relating to associations between items, and includes an "LAID" column 330, a "VersionNo" column 332, a "SourceLIID" column 334, a "TargetLIID" column 336, an "AssoType-LIID" column 338, a "TargetTypeLIID" column 340, an "InverseLAID" column 342, and a "SourceID" column 344. A row in the associations table 306 can be uniquely identified by the value stored in the "LAID" (Local Association Identifier) column 330. The "VersionNo" column 332 can store the latest version number for an association. The "SourceLIID" column 334 and "TargetLIID" column 336 store references to the source and target items associated by an association, respectively. The "AssoTypeLIID" column 338 stores a reference to an association type. The "TargetTypeLIID" column 340 stores a reference to the type of the target item.

The "InverseLAID" column 342 stores a reference to a corresponding inverse association. That is, when two items are associated, two associations can be identified, each stating an association between the items in an opposite direction. For example, the item types "Product" and "Company" can be associated, and an association directed from Product to Company can be identified by a "manufactured_by" association (i.e., indicating the company which manufactures a particular product), and an inverse association, directed from Company to Product, can be identified as a "manufactures" association (i.e., indicating the product(s) a particular manufacturer produces).

The "VersionNo" columns 320 and 332 can provide a sequential ordering of all versions of attributes and associations, respectively, and can be incremented by a predetermined amount (e.g., 1) as new versions of respective attributes or associations are created. Version numbers can allow for a very efficient tracing back to a respective previous version of a given version of an attribute or association, for example to undo changes made to an item. To allow the retrieval of the full history of item relationships (e.g., the versions of an item associated with a specific version of another associated item), cycle numbers can be created and maintained, such as previously discussed with respect to the server 104 (FIG. 1).

Figure 4:
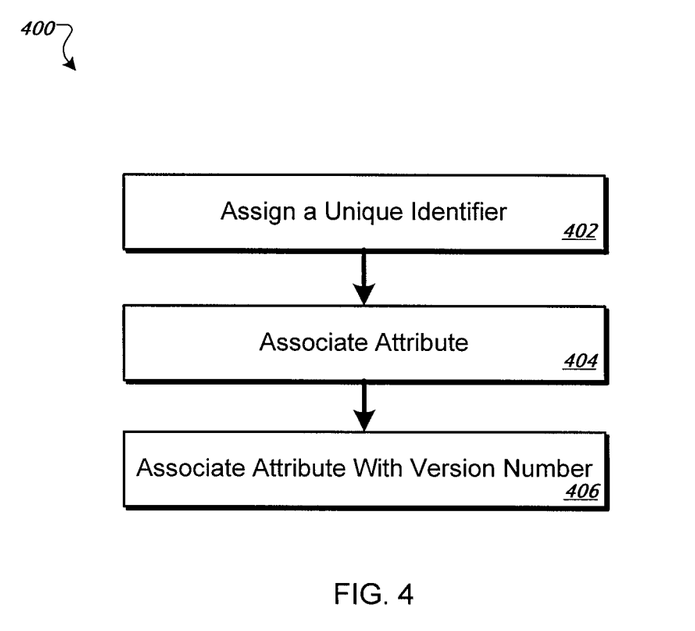
FIG. 4 is a flowchart of a method for associating a version number with an attribute.

FIG. 4 is a flowchart of a method 400 for associating a version number with an attribute. The method 400 can be performed by a processor executing instructions stored in a computer-readable medium. For example, the method 400 can be performed in the system 100, such as by the computing device 102.

In step 402, a unique identifier is assigned to an item in a repository, the item supporting versioning and being subject to a data model having no predefined schema for items. For example, a unique identifier can be assigned to an item stored in the repository 110. The item can be, for example, the product item 202. The item can be physically stored in the repository 110 in the table 302, and the unique identifier can be stored in the "LIID" (Local Item Identifier) column 308.

In step 404, a first attribute is associated with the unique identifier, the first attribute being part of the item and being configured for modification. For example, a product code attribute of the item 202 can be associated with the unique identifier. A row for the product code attribute can be stored in the attributes table 304, where the row is associated with the unique item identifier by use of the "ItemLIID" column 322.

In step 406, the first attribute is associated with a version number, where the versioning is supported without recording in the repository a time period when the first attribute is valid. For example, the product code attribute of the item 202 can be associated with a version number and the version number can be stored in the "VersionNo" column 320 of the attributes table 304 in a row associated with the product code attribute. The value of the "VersionNo" column can be obtained by incrementing an earlier version number associated with an earlier version of the product code attribute by a predetermined amount (e.g., 1), or by using an initial value of 1 if no earlier version number exists.

Figure 5:
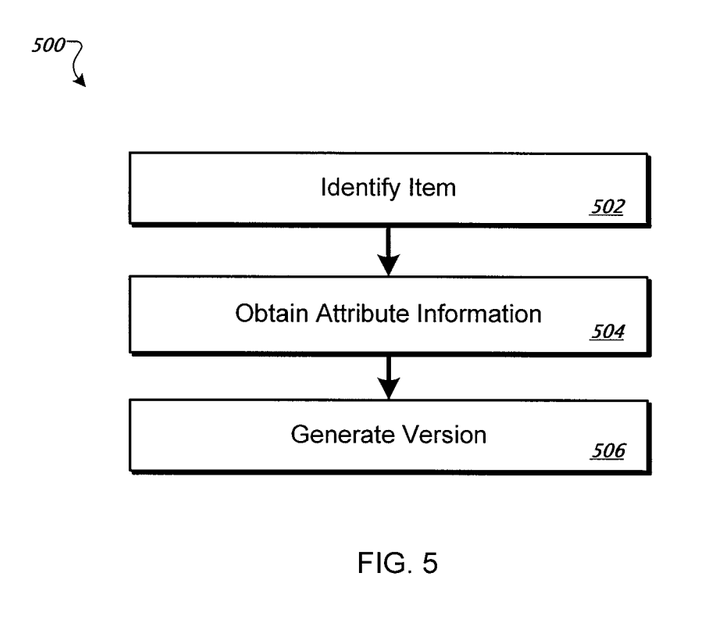
FIG. 5 is a flowchart of a method for generating a version of an item.

FIG. 5 is a flowchart of a method 500 for generating a version of an item. The method 500 can be performed by a processor executing instructions stored in a computer-readable medium. For example, the method 500 can be performed in the system 100, such as by the computing device 102.

In step 502, an item is identified for which an earlier version is to be obtained, the item being subject to a data model having no predefined schema for items. For example, the product item 212 can be identified, and a unique identifier for the product item 212 can be obtained from the repository 110 (such as from the "LIID" column 308 of the InfoItems table 302).

In step 504, attribute information having an association with the item is obtained from a repository using a version number associated with the earlier version, where a time period when the association is valid is not recorded in the repository. For example, any or all of the values of product code, manufacturer, product type, description, price, quantity, item location, and auction-end attributes can be obtained, for example from the repository 110. The attribute information can be obtained from the attributes table 304 without querying based on a time stamp. For example, specific attribute values can be retrieved from the "Value" column 328, with possible data type conversion from a character string value using type information indicated by the "ReprTypeID" column 326. Records associated with the product item 202 can be identified by searching for records in the table 304 which have a value for the "ItemLIID" column 322 matching the identifier of the product item 212 and a value for the "VersionNo" column 320 matching the desired version number.

In step 506, the earlier version is generated based on the attribute information. For example, an object instance which represents an earlier version of the product item 212 can be created by populating the fields of the object instance with values of corresponding attributes obtained from the attributes table 304.

Figure 6:
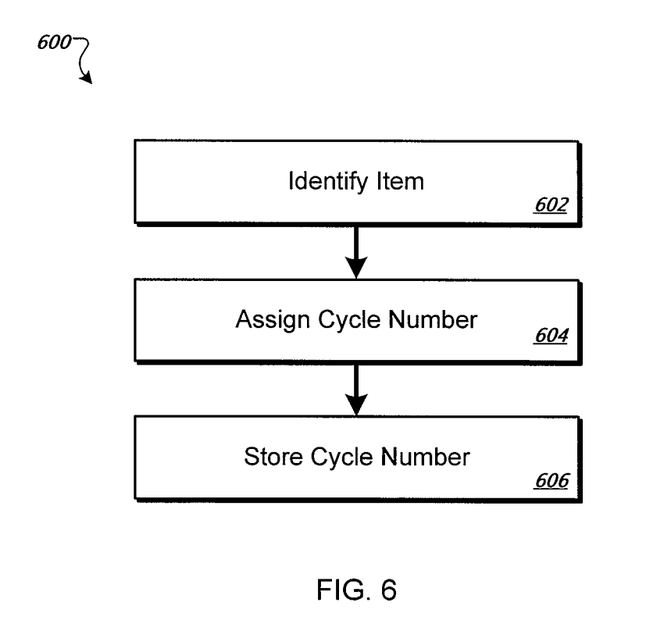
FIG. 6 is a flowchart of a method for associating a cycle number with a version of an item.

FIG. 6 is a flowchart of a method 600 for associating a cycle number with a version of an item. The method 600 can be performed by a processor executing instructions stored in a computer-readable medium. For example, the method 600 can be performed in the system 100, such as by the server 104.

In step 602, an item associated with a new version number is identified, the item having an item identifier and being subject to a data model having no predefined schema for items. For example, the product item 212 can be identified, and a unique identifier for the product item 212 can be obtained from the repository 110 (such as from the "LIID" column 308 of the InfoItems table 302). Identifying an item may include receiving the item identifier and the new version number at a cycle server (e.g., server 104). The item identifier and the new version number can be forwarded asynchronously from a system (e.g., computer device 102) that records information about the item for performing versioning.

In step 604, a cycle number is assigned to the item based on an earlier cycle number associated with an earlier version of the item. For example, an earlier cycle number associated with an earlier version of the item 212 can be obtained from the repository 114, a new cycle number can be generated by incrementing the earlier cycle number by a predetermined amount (e.g., 1), and the new cycle number can be assigned to the item 212.

In step 606, the cycle number and the version number are stored in a repository, in association with the item identifier. For example, the cycle number and the version number can be stored, in association with an identifier of the product item 212, in the repository 114. The repository 114 can track a time when the product item 212 has the version number.

Figure 7:
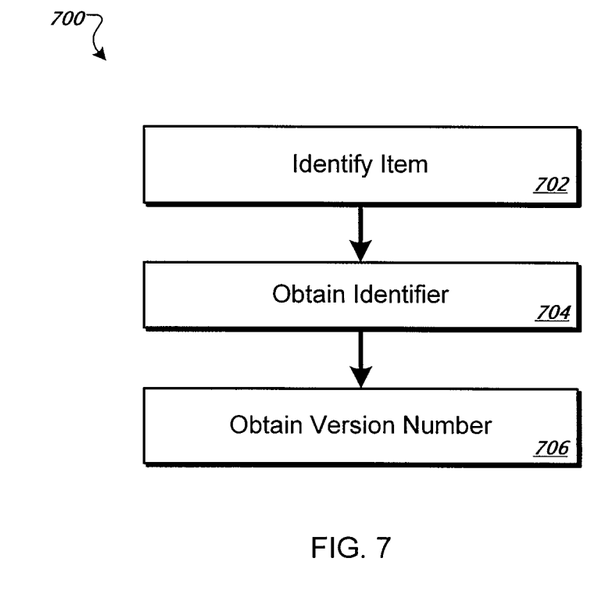
FIG. 7 is a flowchart of a method for obtaining a version number of an associated item.

FIG. 7 is a flowchart of a method 700 for obtaining a version number of an associated item. The method 700 can be performed by a processor executing instructions stored in a computer-readable medium. For example, the method 700 can be performed in the system 100, such as by the server 104.

In step 702, a first item having a version number is identified, where a past state relating to the first item and at least one associated item is to be obtained, the items being subject to a data model having no predefined schema for items. For example, the product item 202 can be identified, and a past state relating to the product item 202 and the associated company item 216 can be obtained. A unique identifier for the product item 202 can be obtained from the repository 110 (such as from the "LIID" column 308 of the InfoItems table 302).

The desired past state of the item 202 can be indicated, for example, by using a date/time stamp or by indicating an earlier version number of the product item 202. In other words, it can be desired to obtain a past state of the product item 202 at a given point in time, along with the state of the associated company item 216 at the same point in time. As another example, it can be desired to obtain an earlier version of the product item 202 along with a state (e.g., version) of the associated company item 216 as the company item 216 existed when the product item 202 had the earlier version number.

In step 704, an identifier is obtained for the associated item. For example, an identifier for the company item 216 can be obtained from the repository 110, such as from the "LIID" column 308 of the InfoItems table 302.

In step 706, at least one version number for the associated item valid for the version number of the first item is obtained from a repository, the repository storing version numbers for a plurality of items organized by cycle numbers. For example, at least one version number for the company item 216 can be obtained from the repository 114, where the obtained version number of the company item 216 is valid for the version number of the product item 202. If the desired past state of the product item 202 had been indicated by a date/time stamp rather than by a version number, the version number of the product item 202 at that point in time can be obtained from the repository 114.

The obtained version number(s) of the company item 216 and the version number of the product item 202 can be used to generate a paste state snapshot. For example, attribute information relevant to the version number of the product item 202 can be retrieved from the repository 110 (e.g., from the table 304) and attribute information relevant to an obtained version number of the company item 216 can also be obtained from the repository 110 and the snapshot can be generated using the obtained attribute information.

In some implementations, more or fewer steps can be performed in any of the methods 400-700. As another example, one or more steps can be performed in another order.

Figure 8:
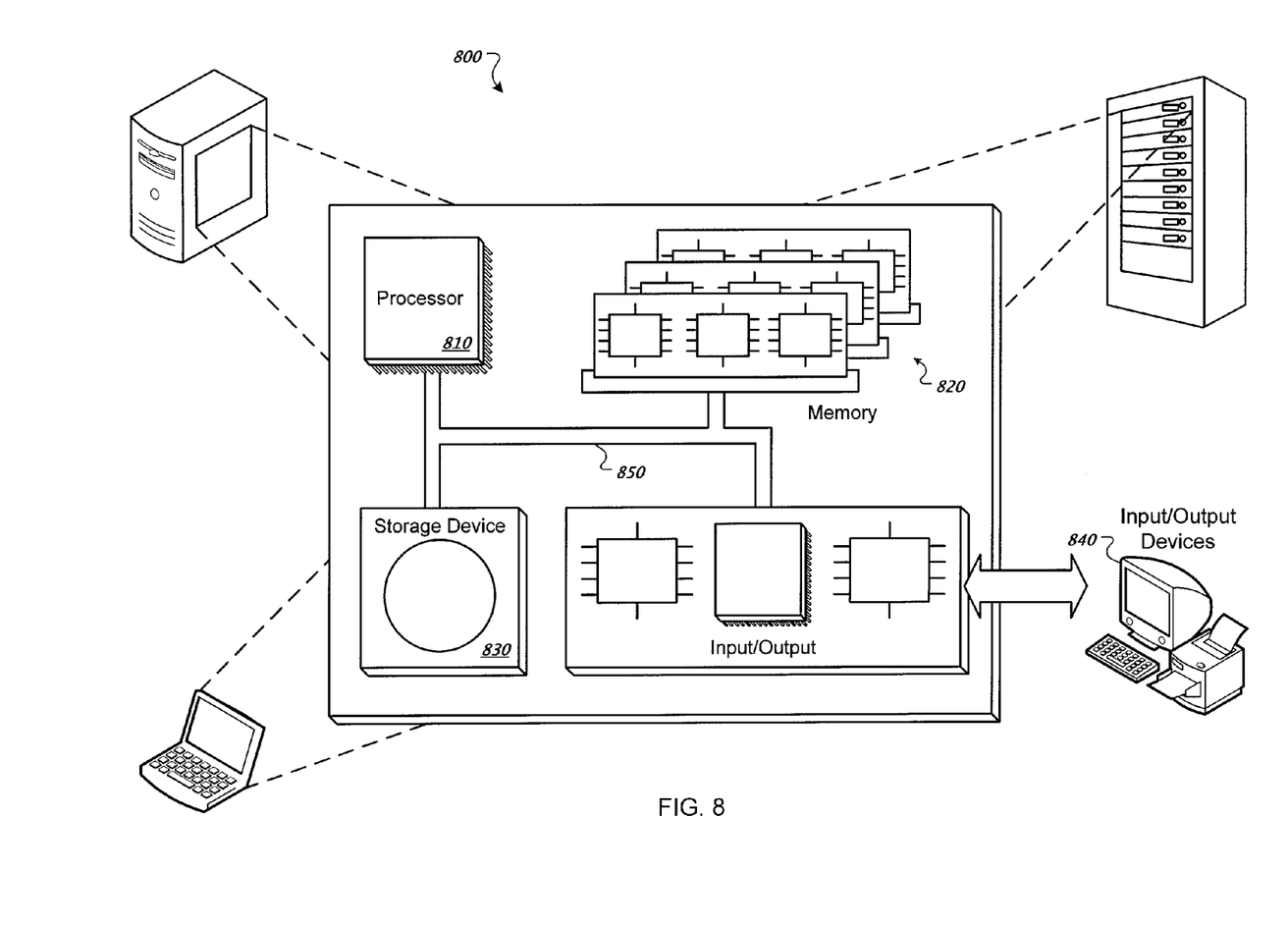
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer program product tangibly embodied in a non-transitory computer-readable storage medium and comprising instructions that when executed by a processor perform a method for recording information about an item, the method comprising:

assigning a unique identifier to an item stored in a repository, the item being included in a set of items, the item supporting versioning and being subject to a data model having no selection of predefined schemas for items, such that an appropriate schema can be derived for the item at a given point in time;

associating an attribute with the unique identifier of the item, the attribute being part of the item and being configured for modification, wherein the attribute includes a type identifier that defines a status of the attribute for an instance of the item, the status including at least one of mandatory, expected, and optional;

associating the attribute with a particular version number of the item during a particular time period of the item, the attribute valid for the particular time period, wherein the versioning is supported without recording in the repository that the attribute is valid for the particular time period; and deriving a schema based on information included in items of the set of items, the information comprising the attribute.

2. The computer program product of claim 1, wherein the attribute includes at least a uniform resource indicator (URI) and a source of the attribute.

3. The computer program product of claim 1, further comprising obtaining the particular version number by incrementing an earlier version number associated with an earlier version of the attribute by a predetermined amount.

4. The computer program product of claim 1, further comprising:

adding an association to the item stored in the repository, the association comprising that the item is associated in the repository with another item also subject to the data model; and associating the association with an association version number.

5. The computer program product of claim 1, further comprising:

associating an additional attribute with the unique identifier, the additional attribute being part of the item and being configured for modification; and associating the additional attribute with an additional attribute version number of the item during an additional time period of when the item was valid, the additional attribute valid for the additional time period, wherein the version is supported without recording in the repository the additional attribute for the additional time period.

6. The computer program product of claim 1, further comprising:

asynchronously updating another repository about the particular version number, the other repository storing version numbers for a plurality of items organized by cycle numbers.

7. The computer program product of claim 6, wherein the repository and the other repository are configured such that:

updating the item to a previous version number is performed using the repository without accessing the other repository and without querying the repository based on a time stamp; and obtaining a past state relating to the item and at least one associated item is performed using the other repository to obtain a valid version number for the associated item corresponding to a version number that the item had in the past state.

8. The computer program product of claim 1, further comprising:

synchronously updating another repository about the version number, the other repository storing version numbers for a plurality of items organized by cycle numbers.

9. A computer program product tangibly embodied in a non-transitory computer-readable storage medium and comprising instructions that when executed by a processor perform a method for obtaining an earlier version of an item, the method comprising:

identifying the item stored in a repository for which an earlier version is to be obtained, the item being included in a set of items, the item supporting versioning and being subject to a data model having no selection of predefined schemas for items, such that an appropriate schema can be derived for the item at a given point in time;

obtaining, from the repository and using a version number associated with the earlier version of the item, attributes having an association with the item, wherein:

the attributes include type identifiers that define a status of an instance of the item, the status including at least one of mandatory, expected, and optional, and a time period when the association of the attributes and the version number associated with the earlier version of the item is valid is not recorded in the repository;

receiving information including which attributes were valid for the version number of the item during the time period;

generating the earlier version of the item based on the information about the attributes; and deriving a schema based on information included in items of the set of items, the information comprising the attributes.

10. The computer program product of claim 9, wherein identifying further includes identifying the item by a unique identifier.

11. A computer program product tangibly embodied in a non-transitory computer-readable storage medium and comprising instructions that when executed by a processor perform a method for recording versioning information about an item, the method comprising:

receiving from a first repository a unique identifier and a version number of a particular item, and further receiving identifiers for additional items associated with the version number of the particular item, wherein a time period when the association of the additional items and the version number of the particular item is valid is not recorded in the first repository, the particular item being included in a set of items, the particular item supporting versioning and being subject to a data model having no selection of predefined schemas for items, such that an appropriate schema can be derived for the item at a given point in time;

assigning a cycle number to the item in response to the receiving, the cycle number based on an earlier cycle number associated with an earlier version of the item;

storing the cycle number and associations of the identifiers for the additional items and the version number of the particular item in a second repository at a particular time; and deriving a schema based on information included in items of the set of items, the information comprising one or more attributes of the particular item.

12. The computer program product of claim 11, wherein assigning the cycle number comprises incrementing an earlier cycle number by a predetermined amount, the earlier cycle number and an earlier version number being associated with the item identifier.

13. The computer program product of claim 11, wherein receiving further comprises:

receiving the unique identifier and the version number of a particular item, and the identifiers for the additional items asynchronously.

14. The computer program product of claim 11, wherein identifying the item comprises:

receiving the unique identifier and the version number of a particular item, and the identifiers for the additional items synchronously.

15. A computer program product tangibly embodied in a non-transitory computer-readable storage medium and comprising instructions that when executed by a processor perform a method for identifying earlier versions of associated items, the method comprising:

identifying a particular item having a particular version number, wherein a previous version of the particular item and at least one additional item associated with the particular item is to be obtained, the particular item being included in a set of items, the particular item supporting versioning and being subject to a data model having no selection of predefined schemas for items, such that an appropriate schema can be derived for the item at a given point in time;

obtaining from a first repository the particular item and the additional item, wherein a time period when the association of the particular item and the additional item is valid is not recorded in the first repository;

obtaining from a second repository a version number that indicates that the additional item is valid for the particular version number of the particular item during the time period, the second repository storing version numbers for a plurality of items organized by cycle numbers; and deriving a schema based on information included in items of the set of items, the information comprising one or more attributes of the particular item.

16. The computer program product of claim 15, further comprising:

generating a snapshot of the previous version of the particular item based on the information obtained from the second repository.

\* \* \* \* \*